United States Patent [19]
Goebel

[11] 3,724,291
[45] Apr. 3, 1973

[54] POSITIONING APPARATUS

[75] Inventor: Fred M. Goebel, Cincinnati, Ohio

[73] Assignee: Le Blond, Inc., Cincinnati, Ohio

[22] Filed: Mar. 29, 1971

[21] Appl. No.: 129,049

[52] U.S. Cl. ..................74/815, 74/813 L, 74/824, 74/826
[51] Int. Cl. ..............................................B23b 29/32
[58] Field of Search.........74/813 L, 813 R, 815, 824, 74/825, 826, 822

[56] References Cited

UNITED STATES PATENTS

| | | | |
|---|---|---|---|
| 3,421,391 | 1/1969 | Delaney | 74/822 |
| 3,532,009 | 10/1970 | Hogan et al. | 74/817 |
| 3,581,602 | 6/1971 | Bachman | 74/822 |

FOREIGN PATENTS OR APPLICATIONS 992,239   5/1965   Great Britain..........................74/815

Primary Examiner—Charles J. Myhre
Assistant Examiner—F. D. Shoemaker
Attorney—Wood, Herron & Evans

[57] ABSTRACT

A positioning system for an indexable slide or turret comprises a bifurcated member located adjacent the turret and engageable with the teeth of a locating gear to accurately position the turret relative to the bifurcated member. The bifurcated member slides in a bore provided within a sleeve. Upon contacting a selected tooth of the gear, the sides of the bifurcated member are wedged apart by the tooth until they contact the sleeve so that each side is wedged between the tooth and the sleeve, thereby positively and accurately positioning the selected tooth of the gear and the attached tool turret.

4 Claims, 2 Drawing Figures

PATENTED APR 3 1973 3,724,291

INVENTOR.
Fred M. Soebel
BY Wood, Herron and Evans
ATTORNEYS

POSITIONING APPARATUS

The present invention relates to slide or turret indexing and particularly to systems for accurately positioning machine tool slides or turrets.

Accurate indexing and particularly accurate repeatability of indexing of a turret is a problem of the utmost importance in machine tools. The criticality of repeatability occurs because of the necessity to machine successively multiple work pieces to very exacting tolerances. As the tool holding turret is indexed from position to position it must be positively and accurately located in each position so that the tool or work piece carried by the turret is held in the same place as was the previous work piece or tool. In this manner, uniformity of cuts or operations and of the resulting work pieces is achieved.

In general, the prior art practice of accurately locating an indexable turret has been to either position a gear or other rotatable member attached to a tool holding turret by way of a shot pin reciprocally extending from a rigid mounting into a cooperating recess of the rotatable member, or to urge a like supported pin into the space between two teeth of a gear attached to the turret. One example of the shot pin and recess technique is disclosed in Jones U.S. Pat. No. 3,465,615. Examples of the pin and gear technique are disclosed in Raehres U.S. Pat. No. 3,150,545 and Mueller U.S. Pat. No. 3,011,245. Another approach has been to seat one curvic gear onto another curvic gear to accurately position a turret attached to one gear relative to a base upon which the other gear is mounted.

While these solutions do render some degree of accuracy, problems arise with each. For instance, where a shot pin and recess combination is used, the mechanism may be subjected to impact damage caused by actuation of the shot pin toward its recess before the rotatable member in which the recess is located has come to rest. When the shot pin falls into its recess, it acts as a stop for the rotatable member and adsorbs the shock of the member as it is abruptly stopped. This shock causes the contacting surfaces to wear and may tend to loosen the mounting elements which support the shot pin, thereby introducing play and inaccuracy into the mechanism.

Furthermore, the shot pin surfaces tend to wear as do the recess surfaces and the surfaces which support the shot pin during its movements. This wear accumulates and causes an unwanted amount of play in the unit, making it very difficult to obtain repeatable accurate positioning of the turret from one work piece operation to the same operation on the next work piece. Even further, the indexing from one position to the next of the turret during an operation on the same work piece is rendered inaccurate.

In the instance where a pin and gear combination is utilized, the elements may be subjected to impact damage as heretofore described. The supporting and cooperating surfaces of these elements also tend to wear with a loss in attainable accuracy proportionate thereto.

The curvic gear solution is accurate but requires the addition of expensive gears to the indexing mechanism as well as expensive mechanism for lifting the turret to disengage the gears prior to indexing movement.

An additional solution to the indexing problem is to drive the turret from position to position with a highly accurate synchronized stepping means. Such a mechanism requires a gear train with virtually no "-slop" or play and therefore is difficult and expensive to manufacture.

It is therefore a primary object of applicant's invention to provide an inexpensive and yet accurate mechanism for positioning or locating a tool holding turret of a machine tool.

It is a further object of applicant's invention to provide a mechanism for repeatedly and accurately positioning a tool holding turret relative to a supporting base with a minimum of accumulative error introduced by wear on the cooperating surfaces.

It is a further object of applicant's invention to provide an indexing and locating mechanism for a tool holding turret which eliminates impact damage to the elements of the mechanism.

It is a further and highly important object of the invention to provide an accurate indexing and locating mechanism for a machine tool utilizing a locating gear and drive mechanism which need not be manufactured to extremely accurate tolerances.

Briefly, the invention comprises a locating gear fixed to a tool slide or turret so that the slide or turret moves with the gear. A reciprocating plunger is provided adjacent the gear so that it may contact the gear with a bifurcated yoke-like member mounted on its end. The plunger is activated by a double-acting hydraulic cylinder to move the yoke into and out of contact with a selected tooth of the gear.

In the preferred embodiment, the bifurcated yoke-like member reciprocates in a bore which is provided with a sleeve and which is positioned closely adjacent the gear. The yoke-like member is constructed so that, as it is urged into contact with a tooth of the gear, the two sides of the yoke are spread apart until they contact the respective inner surfaces of the sleeve. If the tooth is on center, the gear is thus solidly positioned with respect to the inner surfaces of the sleeve. If the tooth is off center, only one side of the yoke member will at first contact the tooth and respective sleeve surface and as the yoke is driven further toward the tooth of the gear, it will be urged to move toward a center position, where it will be wedged solidly between the two sides of the yoke, each of which finally contacts the sleeve.

In this manner, a tooth on the gear is always centered with respect to the inner surfaces of the sleeve. It can be appreciated that, even though the sleeve surfaces wear, the sides of the yoke member when contacting a tooth always expand into non-yielding lateral contact with them and therefore the tooth is always centered regardless of wear on the sleeve or the gear tooth or tooth engaging surfaces of the yoke.

In the illustrated embodiment, a worm-gear drive is provided for indexing the locating gear and the turret to the next position. The worm-gear drive is powered by an hydraulic motor which is stopped when the locating gear and turret are in the approximate general position and the plunger is activated to move the yoke member into wedging contact with a tooth. If the tooth is not on center, it is wedged into its correct position by the yoke as previously described, thereby slightly over driving the worm-gear and hydraulic motor.

An hydraulic clamping mechanism may be provided to positively clamp the turret into position after it has been accurately positioned by the yoke member.

Other objects and advantages will become apparent from the following detailed description and drawings in which:

FIG. 1 is a top view showing the locating gear, the bifurcated yoke member in its sleeve and the worm-gear drive, and FIG. 2 is a view taken along lines 2—2 of FIG. 1 and showing the clamping features of the invention and general cross-section of the turret mounting plate, locating gear and worm-gear drive with the screw omitted.

DESCRIPTION OF A PREFERRED EMBODIMENT

Figure 1:
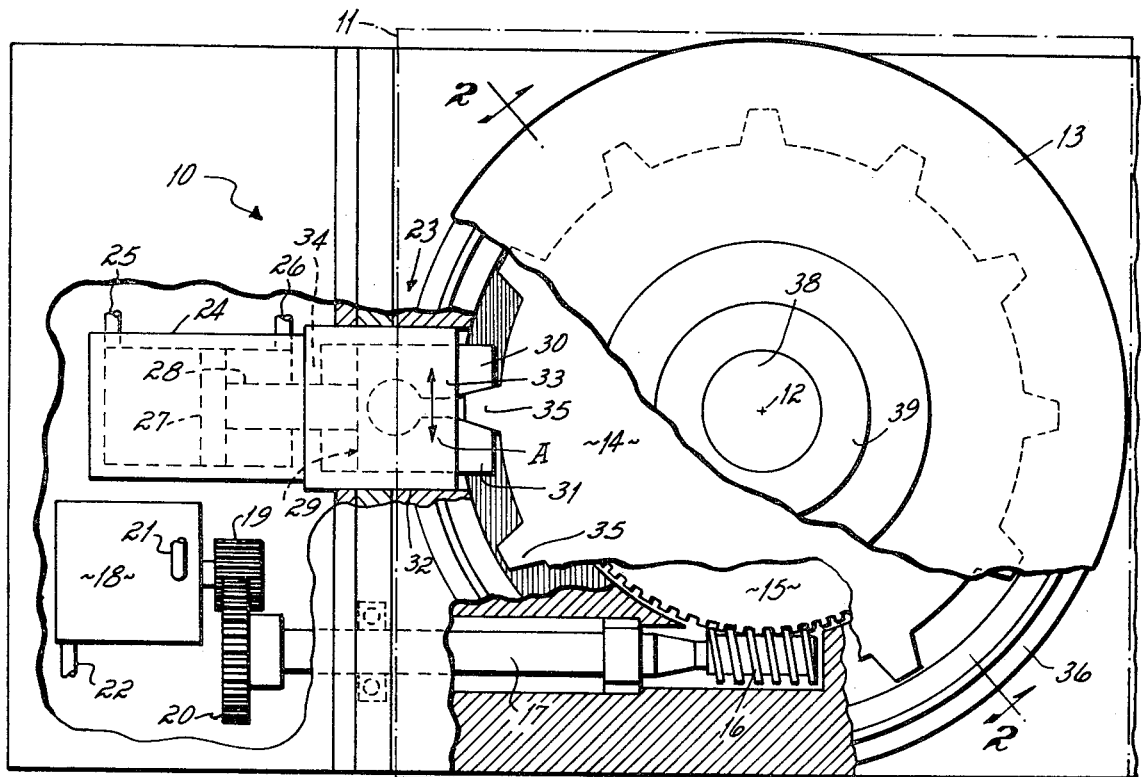

Referring to the drawings and in particular FIG. 1 thereof, there is shown at 10 a preferred embodiment of the indexing apparatus. A turret 11 is shown in phantom for clarity and may be of any known type which holds a tool or tools for performing some work on a work piece. In a machine tool, such a turret is usually mounted upon a carriage which reciprocates along the longitudinal axis of the machine tool and which has means for reciprocating the turret in an axis perpendicular to that of the machine tool.

The turret 11 is generally rotatable about an axis 12 and may be activated by any known means. In the preferred embodiment, the turret is rigidly connected to a mounting plate 13 by means of screws or pins (not shown) and the mounting plate is secured to a locating gear 14, also by screws or pins (not shown). A drive gear 15 is rigidly mounted about a pilot of the locating gear 14 such that, when the drive gear is rotated, it imparts rotary motion about axis 12 to the locating gear, the mounting plate and the turret.

Drive gear 15 is driven by drive screw 16 which is connected to shaft 17 and which forms a worm-gear drive. This shaft is rotated by an hydraulic motor, shown at 18, through gears 19 and 20. Motor 18 has an output 21 and an input 22 through which hydraulic fluid is applied under pressure for driving shaft 17 and screw 16 when it is desired to rotate the turret.

The indexing means is shown generally at 23. It includes an hydraulic actuator 24 with inputs 25 and 26, piston 27 and plunger 28. A bifurcated yoke member 29 is secured to the end of plunger 28 and may be made of hardened steel or like material. It is formed of two generally symmetrical side members 30 and 31 which may slightly flex in a lateral direction as indicated by arrow "A." The yoke member 29 is positioned for reciprocal movement in a bore 32. The bore 32 may be provided with a hardened steel sleeve 33 which may be press fitted or otherwise mounted in the bore. Sleeve 33 is shown in a generally cup-shaped configuration with an end wall 34. A bleed hole (not shown) may be provided at the end wall of the sleeve for allowing air to escape when yoke member 29 is moved toward it. It is noted that bore 32 and sleeve 33 are positioned in proximity to gear 14 so that yoke members 30 and 31 may engage a tooth 35 of gear 14 when the yoke member is moved toward gear 14.

Figure 2:
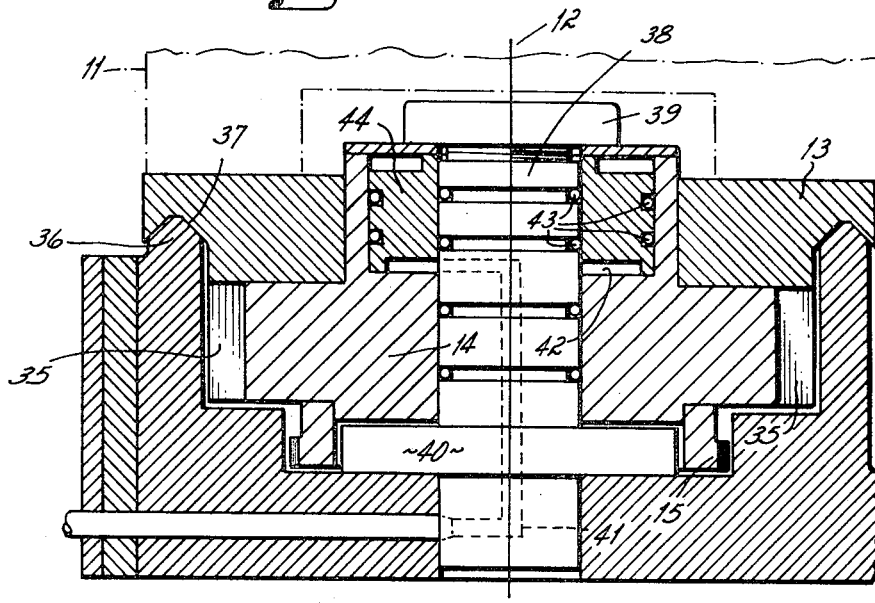

The details of the manner in which the mounting plate 13 is solidly clamped to its plate support 36 are shown in FIG. 2. Mounting plate 13 is provided with a circular groove 37 which cooperates with support 36 to solidly hold the plate.

A spindle 38 is provided through axis 12. It has a head 39 and is locked against an excess of vertical movement by virtue of an integrally formed flange 40 which is attached by screws to a rigid portion of the mechanism. It can be seen that spindle 38 extends through mounting plate 13, locating gear 14 and drive gear 15 in a bore provided in each of these elements. An hydraulic line 41 is provided through spindle 38 and has an outlet into annular chamber 42. Seals 43 are provided in sealing member 44 and spindle 38 as shown to prevent seepage of hydraulic fluid from said chamber.

In operation, the turret is driven to its approximate position by way of the worm-gear drive 15 and 16 through locating gear 14 and mounting plate 13. The locating gear is provided with a tooth 35, its position corresponding on the gear to the desired position of the tool holding turret, when the tooth is engaged by the bifurcated yoke 29.

After the gear has been rotated into position and stopped, the plunger 28 is urged toward gear 14 by the hydraulic actuator 24. Fluid pressure is applied to input 25 of the actuator so as to urge piston 27 and plunger 28 toward the gear. If the tooth 35 of gear 14 is in its exact desired position, the side members 30 and 31 contact tooth 35 on each of its sides and are wedged apart in the direction of arrow "A" until they contact the inner surface of sleeve 33. The tooth is thereby held in non-yielding lateral contact, positively positioning the gear, mounting plate and turret. Since the locating gear is driven into position by the worm-gear drive and stopped prior to actuation of the yoke member, no impact damage results to the locating gear teeth 35 or the yoke member.

Due to some play in the worm-gear drive or other factors, however, the tooth 35 may not come to rest at its exact desired location. The drive is accurate enough to position the gear and tooth such that the tooth is always in a position to be engaged by yoke member 29, although it may be slightly misaligned. Upon movement of the piston 27 and plunger 28, the yoke member will move toward the off-center tooth and either side 30 or side 31 will first contact it. As the yoke member is urged further toward the tooth, the contacting side 30 or 31 will have a wedging effect upon the tooth so as to move it in a lateral direction toward the other side member. This movement rotates the turret accordingly, thereby positioning it as the tooth 35 is positioned. When the tooth contacts the opposing side member, the yoke continues toward the gear and the side members are spread apart into non-yielding lateral contact with the sleeve, thereby positioning the tooth positively with respect to the inner surface of the sleeve. This positioning also slightly rotates drive gear 15, and may over drive hydraulic motor 18 which has been stopped at this point.

It can be readily appreciated that the indexing position attained by these elements is highly accurate and eliminates any play usually found within the sleeve or bores of prior locating pins. Furthermore, each tooth of the gear is positively positioned with respect to the inner surface of the bore and this positioning is the same for the repeated locating of the same tooth. Each time the turret is to be located in the same position, the same tooth is contacted by the yoke member and positioned in the same place, thereby insuring that each position of the turret may be accurately repeated over a run of a plurality of work pieces.

The actuation of the hydraulic actuator 24 may be controlled by known machine tool control means such as a tape programmer for instance. A test cut may be run with the program being fixed for each cut and adjusted for any differences in the indexing movement from tooth to tooth and for tool offset corrections.

Wear of the various contacting surfaces such as the gear tooth 35, the tooth contacting portions of the yoke side members 30 and 31, the outer surface of the yoke 29 and the inner surface of the sleeve 33 may occur over the operating life of the machine, however, it will be appreciated that such wear is always taken up by the spreading action of the yoke member into non-yielding contact with the sleeve. Over an average run of a plurality of the same work pieces or over successive but varied runs of different work pieces, it is contemplated that the locating gear will slightly overrun its desired position as many times as it will stop slightly short thereof when it is indexed. Thus, wear on the respective sides of the tooth contacting surfaces of side members 30 and 31 and the yoke and sleeve will be generally even, resulting in one or only negligible accuracy changes over the useful life of the machine.

After the locating gear 14 is accurately positioned, the mounting plate 13 is rigidly clamped to supports 36 for the actual cutting operation. Pressure is applied to chamber 42 through hydraulic line 41. This exerts pressure against sealing member 44 which bears against the rigid head 39 of spindle 38. As these elements are non-yielding pressure is exerted upon locating gear 14 in a downward direction. As gear 14 moves downwardly, it pulls the mounting plate 13 into rigid contact with support 36, the support being shaped to enter the circular groove 37. This pressure is maintained during the cutting operation and insures a rigid mount for the turret.

When it is desired to index the turret to another location, this pressure is released and the mounting plate is loosened from its support so that it and the locating gear can be rotated by the worm-gear drive to the next position. Before rotation, pressure is applied to input 26 of the actuator 24 so as to move piston 27 and plunger 28 to withdraw the yoke member and allow the locating gear to be rotated.

It can readily be appreciated that my invention accomplishes a number of advantageous results over the prior art. Included in these is the ability to repeatedly and accurately locate the turret in the same position for each respective cut. Wear of the moving parts does not cause a loss of accuracy of the apparatus and the machine maintains an extremely high degree of accuracy over its useful life. No expensive or highly accurate "slop" free gears or gear trains are required and thus all gears including the locating gear may be made of normal industrial manufacture.

These and other objects, advantages and modifications will be appreciated by those of ordinary skill in the art, and I intend to be bound only by the appended claims.

Having specifically described my invention, I claim:

1. In a machine tool apparatus including a tool holding turret, a rotatable locating gear operably secured to said turret and indexing means for terminally positioning said gear and turret at a predetermined point including,
   a bore positioned in proximity to said gear,
   a reciprocating plunger means positioned in said bore for engaging said gear upon movement toward said gear,
   said plunger means including at its gear-engaging end a bifurcated yoke means for engaging a tooth of said gear, said bifurcated yoke means comprising an integral yoke having two side members resiliently and integrally joined together at respective rearward ends thereof, and disposed to operably engage internal surfaces of the bore upon engagement of the yoke means with a tooth of said gear so as to expand said yoke means,
   said turret being mounted upon a mounting plate attached to said gear, and hydraulic means for clamping said mounting plate and said turret to a plate support.

2. Apparatus as in claim 1 wherein said hydraulic means includes a fluid line in a rigidly mounted spindle about which the locating gear rotates, said line having an outlet into a chamber between a head of the spindle and said locating gear, said chamber having a surface defined by said locating gear such that when fluid pressure is applied to said chamber, it urges said gear and said plate into contact with the plate support.

3. In a method of accurately positioning a rotatable tool-holding turret of a machine tool having a toothed locating gear secured to said turret, the steps comprising:
   mounting the turret on a mounting plate,
   fixing the mounting plate on said gear,
   reciprocating a bifurcated yoke having side members resiliently connected at rearward ends thereof, in a bore provided in proximity to said gear,
   wedgingly engaging a tooth of said gear within said yoke upon reciprocation of said yoke toward said gear so as to expand said yoke by pivoting side members thereof about resiliently connected rearward ends into nonyielding lateral contact with said bore, thereby positively centering said tooth, gear and turret relative to said bore, and
   thereafter hydraulically clamping said plate to a support.

4. In a machine tool apparatus including a rotatable table, a locating gear fixedly secured to said table and locating means for terminally positioning said gear and table at a predetermined angular position, said locating means including:
   a bore positioned in proximity to said gear,
   a reciprocating plunger means positioned in said bore for engaging said gear upon movement toward said gear,
   said plunger means including at its gear-engaging end an integral bifurcated yoke for engaging a tooth of said gear, said bifurcated yoke comprising two integrally connected side fork sections located in a common plane and resiliently and integrally joined together at respective rearward ends thereof, said side fork sections having diverging inside surfaces adjusted to engage the peripheral surface of a tooth of said gear and be wedged apart upon movement of said plunger means toward said gear, said fork sections of said yoke having outside surfaces adjusted to engage internal surfaces of said bore upon engagement of said yoke with a tooth of said gear and subsequent wedging apart of said fork sections, said bore, plunger means and gear being located so that when said plunger means is moved toward and engages said gear, said bore extends forwardly of the joined rearward ends of said side fork sections and its internal surfaces engage said side fork sections forwardly of said joined rearward ends, and means for actuating said plunger means into engagement with said gear tooth such that said fork sections of said yoke are wedged apart within said common plane by said gear tooth and the outside surfaces of said fork sections are moved into engagement with said bore, each of said fork sections of said yoke being pressed with equal force against opposite sides of said bore so that said gear tooth is accurately positioned with respect to said opposite sides of said bore.

* * * * *